United States Patent [19]

Chien

[11] Patent Number: 5,566,384
[45] Date of Patent: Oct. 15, 1996

[54] VEHICLE WITH AN EL LIGHT STRIP

[76] Inventor: Tseng-Lu Chien, 8th Fl., No. 9, San Min Rd., Taipei, Taiwan

[21] Appl. No.: 247,673

[22] Filed: May 23, 1994

[51] Int. Cl.$^6$ .................................... F21V 9/16
[52] U.S. Cl. .................. 362/84; 362/61; 362/80; 362/276; 362/802; 362/812; 40/544; 40/556
[58] Field of Search ............. 362/83.3, 84, 276, 362/802, 80, 80.1, 82, 83, 83.2, 812, 61; 40/544, 556

[56] References Cited

U.S. PATENT DOCUMENTS

| 4,443,832 | 4/1984 | Kanamori et al. | 362/84 |
| 4,494,326 | 1/1985 | Kanamori | 362/84 |
| 4,864,473 | 9/1989 | Tokarz et al. | 362/84 |
| 5,434,013 | 7/1995 | Fernandez | 428/690 |

FOREIGN PATENT DOCUMENTS 141348   5/1990   Japan .................................. 362/84

Primary Examiner—Ira S. Lazarus
Assistant Examiner—Alan B. Cariaso
Attorney, Agent, or Firm—Bacon & Thomas

[57] ABSTRACT

A Moving vehicle illuminated sign incorporated with D.C. power supply, electric circuit, function control circuit, electroluminescent light strip, switch, housing. Stick on vehicles' body by glue to give other vehicles' message for special situation or warning signal for unexpected situation on road. As EL light strip can easy bendable so can easily attached on any space of moving vehicles to meet the curve surface. This will be unique universal type for all moving vehicles. The extra warning light will protect moving vehicle been seen at night by other road user.

3 Claims, 5 Drawing Sheets

VEHICLE WITH AN EL LIGHT STRIP

BACKGROUND OF INVENTION

A illuminated sign designed having a super bright signal to other vehicles when meet some special situation on the road. The current invention also can create a pre-warning lighted signal to other vehicles for special attention when apply this signs on the vehicles. The flexible light panel can have different message such as the "NO KISS", "STOP", "BABY ON BOARD", "I LOVE YOU", "I LOVE N.Y." and etc. The D.C. power supply certain input current for system. An electric circuit supply one transformer and some electric components to convert the D.C. current to A.C. current with certain voltage and frequency to match the EL light strip's trigger specification. The function control circuit is designed for special light show such as flashing, time delay flashing on-off, steady on, fade in-out, sequential on-off. The switch offer and trigger power for system. The switch can be tilt, vibration, motion, motion, photo sensor for trigger system to emitted the signal to other cars and road users.

The invention also can be easily attached on any place on the vehicles such as bumper as bumper sticker with "funny message" or religion message, personal feeling for express personality on this illuminated panel.

As all splendid idea/message is useless at dark environment, so current invention let all such things be lighted for much practical purpose. By providing an electroluminescent (EL) light strip can attached on automobiles, motorcycles, bicycles, tricycles, stroller, handicap for special warning light by this EL light strip or strips. Plusing the multi-color can not achieve from other light supply such as L.E.D. (lighting emitted diode). Not only the color but also the unbreakable features of the EL light strip or strips.

The EL light strip can easily be attached to the exterior of the vehicle using glue, velcro tape, double side foam tape to attach on any kind of surface with perfect curve warning signal.

SUMMARY OF INVENTION

It is the primary object of the present invention to provide a useful illuminated sign for moving vehicles. The flexible, unbreakable, low cost, easily attachment to anywhere can protect the all lives inside of the moving vehicle.

This and other objects of the invention will become clear from an inspection of the detailed description of the invention and from the appended claims:

DETAILED DESCRIPTION OF PREFERRED EMBODIMENT

Figure 1:
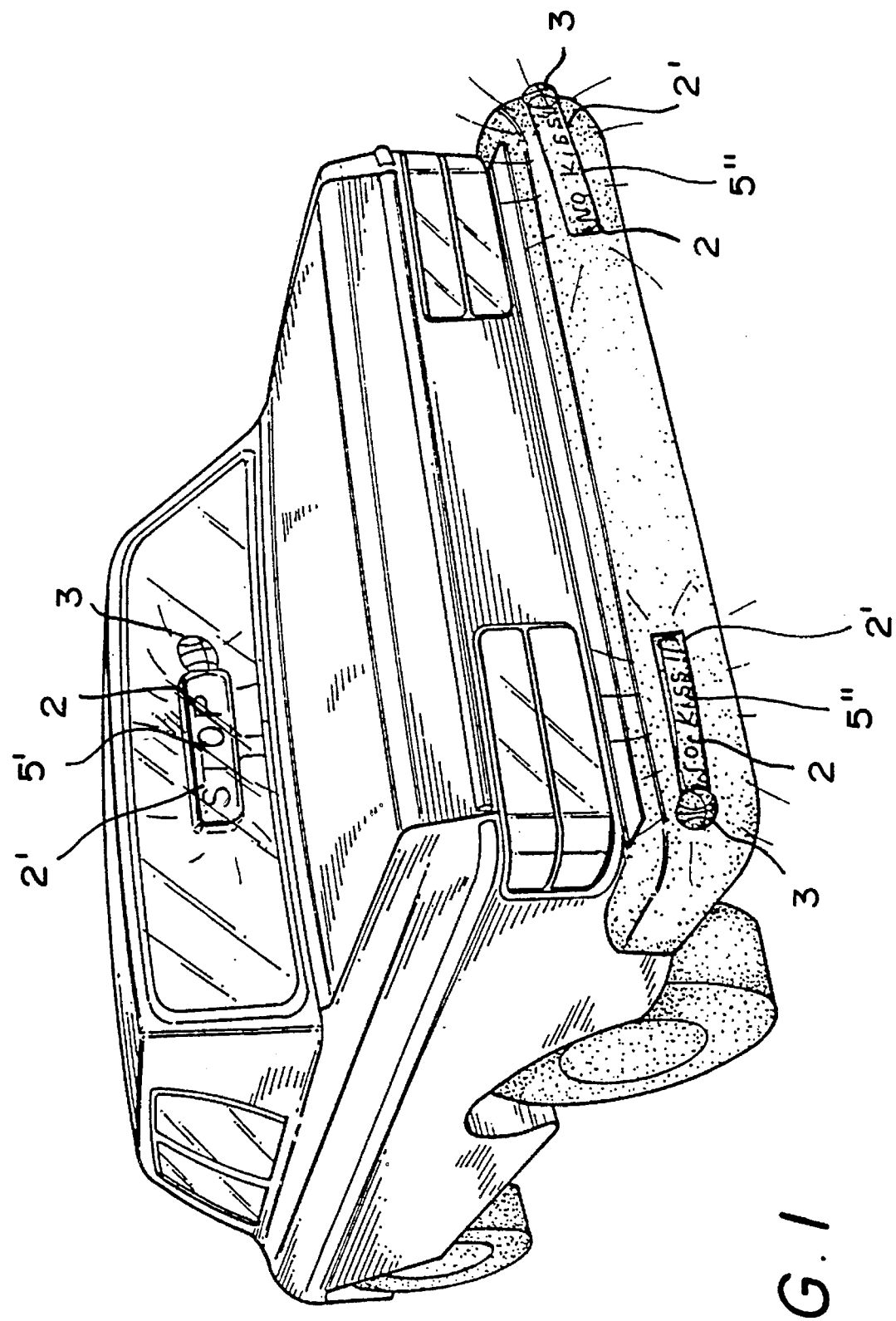
FIG. 1 is a perspective view of a vehicle which uses three EL light strips each of which is connected with a power pack in accordance with a first embodiment of the present invention.

FIG. 1 shows a car which uses three EL light strips 2. enclosed within flexible sleeves 2', each EL strip 2 being connected with a power pack 3 in accordance with a first embodiment of the present invention. The EL light strips 2 will not be described in detail as they are identical to the EL light strips which are described in the applicant's co-pending U.S. patent application No. 08/421,021, but it is noted that the flexible sleeve may be transparent or have non-transparent sections, that it holds the light panel between upper and lower layer joined together to provide weather proofing and protection from ultra-violet light, and that the sleeve can be silk-screen printed for providing a more attractive appearance during day light when the strip is not lit. As illustrated, for example, the sleeves 2' have different patterns thereon, including a "stop" pattern 5' and a "no kiss" pattern 5". The EL light strips 2 and the power packs 3 can be attached to the car by adhesion or any other appropriate devices.

Figure 2:
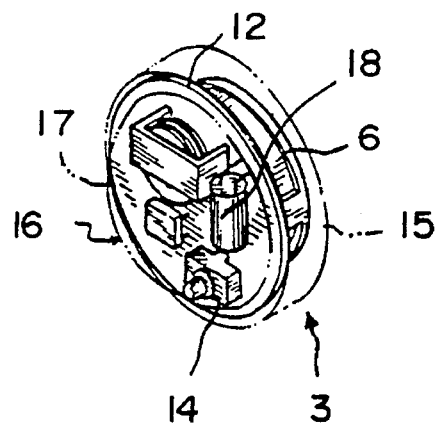
FIG. 2 is an enlarged view of the power pack shown in FIG. 1, showing a housing in phantom lines in order to show components which are contained in the housing.

Referring to FIG. 2, each power pack 3 includes a housing 16 which contains a plurality of components of a circuit 4 (see FIG. 3 and 4) which provides power to an EL light strip. The components include a direct current (DC) power supply 6 such as a dry battery, a DC/AC convertor 8, a transformer 10, a function interface 12, a push-button switch 14, and/or a sensor-controlled switch 18 device. The sensor controlled switch device 18 can be a vibration-sensitive switch, a photo-sensitive switch, a tilt-sensitive switch, of a pressure-sensitive switch.

Figure 3:
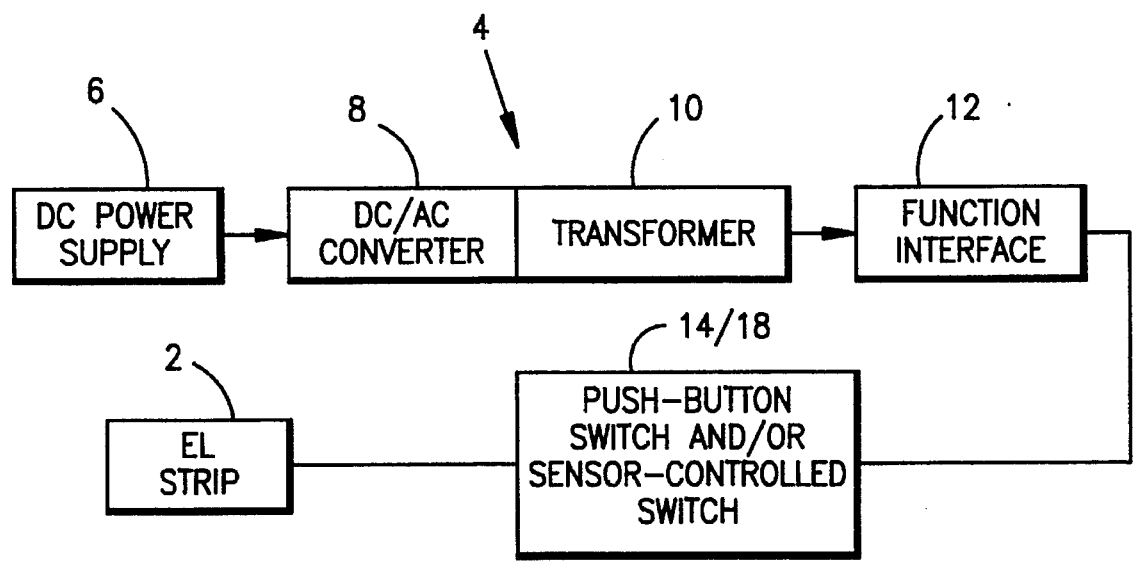
FIG. 3 is a block diagram of a combination of an EL light strip and a power pack shown in FIG. 1.
Figure 4:
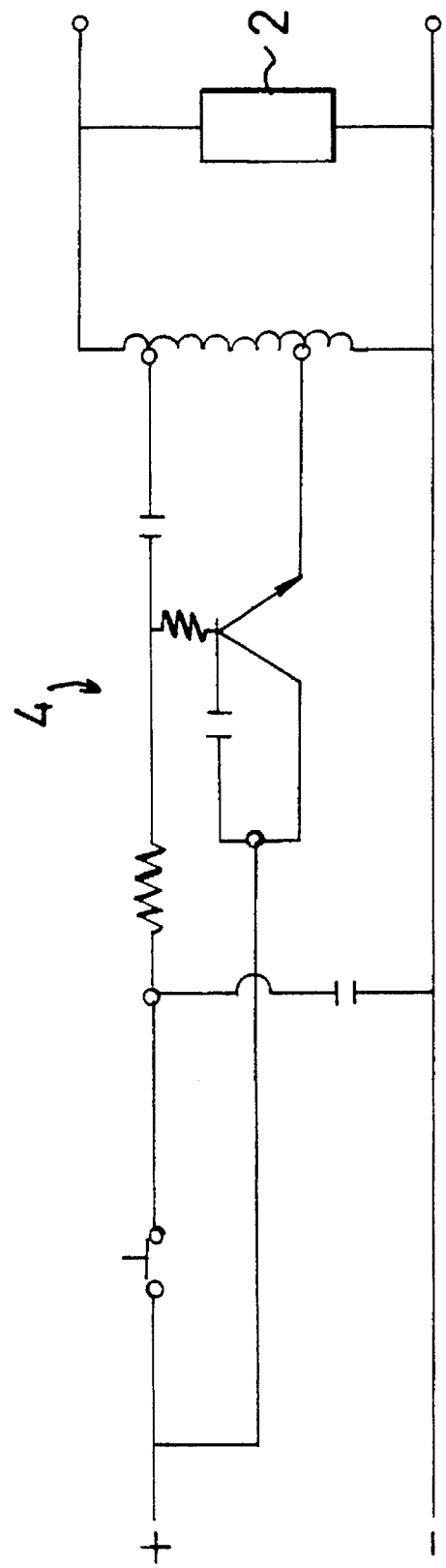
FIG. 4 is a schematic view of a circuit for powering an EL light strip shown in FIG. 1.

Referring to FIGS. 3 and 4, the DC power supply 6, such as a dry battery, is connected with a direct-current-to-alternating-current convertor 8 (DC/AC convertor). The DC/AC convertor 8 is connected by means of a transformer 10 to a function interface 12. The function interface 12 is connected by means of switch 14 and/or switch 18 to the EL light strips.

The DC power supply 6 is used to provide electricity for the EL light strips. For convenience, the DC power supply 6 is preferably a dry battery so that it is easily attached to the vehicle.

A direct current is sent from the DC power supply 6 to the DC/AC convertor 8. The direct current is converted into an alternating current by means of the DC/AC convertor 8. The DC/AC convertor 8 can be selected in order to provide a desired frequency of the alternating current.

The alternating current is sent from the DC/AC convertor 8 to the transformer 10. The voltage of the AC is increased by means of the transformer 10.

The voltage-increased AC is sent from the transformer 10 to the function interface 12. The function interface 12 provides a plurality of options which include "regular short interval flashing" "permanent 'ON'", "regular short interval flashing interspersed with regular 'OFF' periods", "irregular interval flashing", and "phased-in and phased-out flashing". The function interface 12 provides various ways in which the EL light strips flash. The function interface 12 can be an integral circuit or any other means.

The housing 16 consists of a hollow base 15 and an elastic semi-spherical cover 17. Thus, a user can easily press the elastic semi-spherical cover 17 in order to press the pushbutton switch 14.

Figure 5:
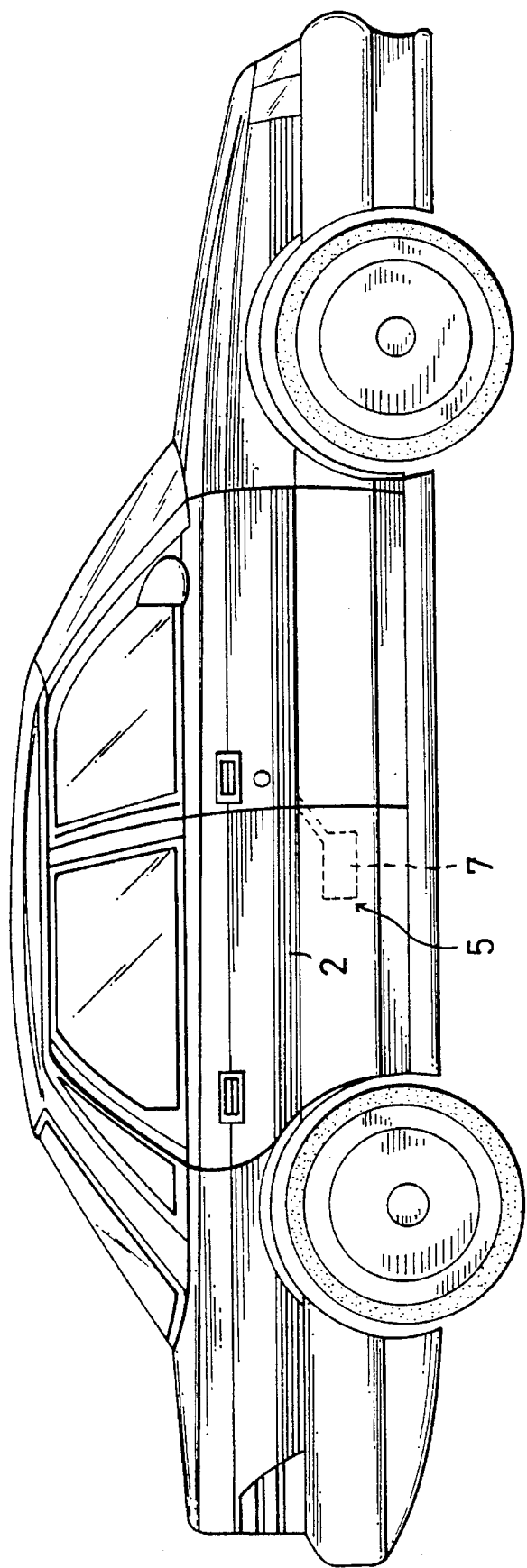
FIG. 5 is a side view of a car which uses a plurality of EL light strips each of which is connected with a power supply of the car through a power pack in accordance with a second embodiment of the present invention.
Figure 6:
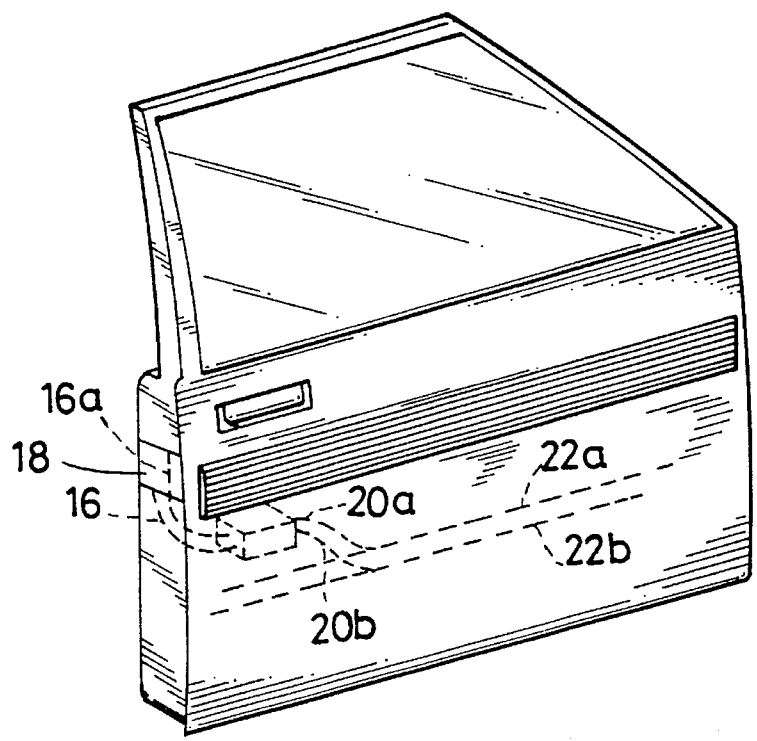
FIG. 6 is an enlarged view of an EL light strip and a power pack shown in FIG. 5.

FIGS. 5 and 6 show a car which uses a plurality of EL light strips 2 each of which is connected with a power supply (not show) of the car by means of power pack 5 in accordance with a second embodiment of this invention. The power pack 5 includes a case 7 which contains a plurality of components which include a DC/AC convertor 8, a transformer 10, a function interface 12 and a switch 14. In the second embodiment of the present invention, the DC power supply 6 is the power supply of the car. Therefore, the DC power supply is not contained in the case 7. The DC/AC convertor 8, the transformer 10, the function interface 12 and the switch 14 are connected with one another as mentioned above, therefore, will not be described again.

Each EL light strip 2 is connected with the power pack 5 by means of a pair of wires 16a and 16b. The pair of wires 16a and 16b is enclosed in a flexible strip 18 which is adhered to the door. A pair of wires 20a and 20b leads to the power pack 5. A pair of wires 22a and 22b leads to the power supply of the car. To connect the power pack 5 with the power supply of the car, the pair of wires 20a and 20b is connected with the pair of wires 22a and 22b.

Figure 7:
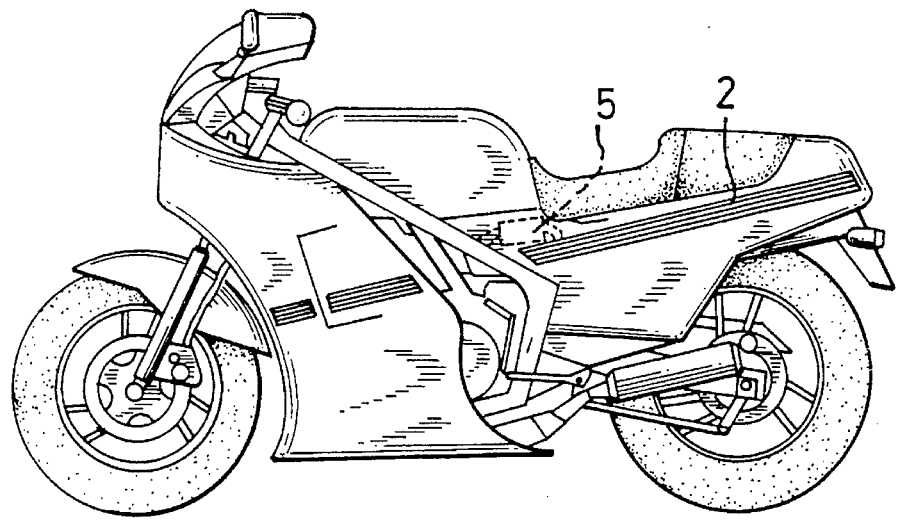
FIG. 7 is a side view of a motorcycle which uses a plurality of EL light strips each of which is connected with a power supply of the motorcycle by means of a power pack shown in FIGS. 5 and 6.

Referring to FIG. 7, a plurality of EL light strips 2 and a corresponding number of power packs 5 are used in a motorcycle. The EL light strips 2 and the power packs 5 are connected with a power of the motorcycle in a similar way to that the EL light strips 2 and power packs 5 are connected with the car shown in FIGS. 5 and 6.

What is claimed is:

1. An electroluminescent (EL) warning sign for a vehicle, comprising:

at least one EL strip enclosed in a flexible sleeve;

a circuit which includes a DC/AC converter connected with a DC power supply for supplying AC power to the EL strip, a function interface, a sensor, and a switch controlled by the sensor and connected between the function interface and the EL strip, wherein the function interface includes means for providing a lighting effect selected from the group consisting of steady on, random, chasing, sequential and fade in-out effects, and the sensor is selected from the group consisting of a tilt sensor, a vibration sensor, a motion sensor, a photo sensor and a heat sensor;

a separate housing for enclosing the DC/AC converter, the function interface. and the switch; and means for attaching both the housing and the sleeve anywhere on the vehicle, including its exterior.

2. A sign as recited in claim 1 wherein the DC power source is a DC power supply for the vehicle.

3. A sign as recited in claim 1 wherein the EL strip includes areas having numbers, drawings, or messages thereon.

* * * * *